Jan. 14, 1964         R. W. SNYDER         3,117,383
ACCELEROMETER SIMULATOR
Filed Aug. 30, 1962

INVENTOR.
RALPH W. SNYDER
BY
Lawrence S. Epstein
ATTORNEY

United States Patent Office 3,117,383
Patented Jan. 14, 1964

3,117,383
ACCELEROMETER SIMULATOR
Ralph W. Snyder, Cuyahoga Falls, Ohio, assignor, by mesne assignments, to the United States of America as represented by the Secretary of the Navy
Filed Aug. 30, 1962, Ser. No. 220,971
1 Claim. (Cl. 35—12)

The present invention relates to the simulation of an accelerometer mounted along the vertical axis of a maneuverable vehicle.

It is an object of the present invention to simulate the output from an accelerometer mounted along the Z axis of an aircraft during coordinated turns.

Another object of the present invention is to simulate the operation of an accelerometer used to compensate an aircraft fire control system for the effects of aircraft bank angle.

Other objects and many of the attendant advantages of this invention will be readily appreciated as the same becomes better understood by reference to the following detailed description when considered in connection with the accompanying drawings wherein.

Figure 1:
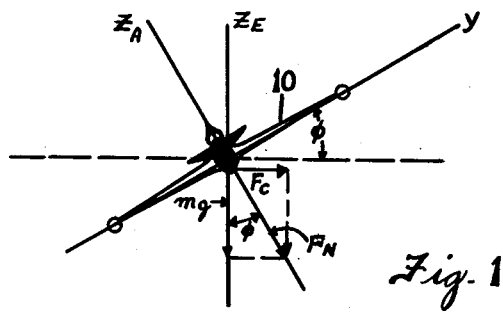
FIG. 1 shows the function of the applicant's invention.
Figure 2:
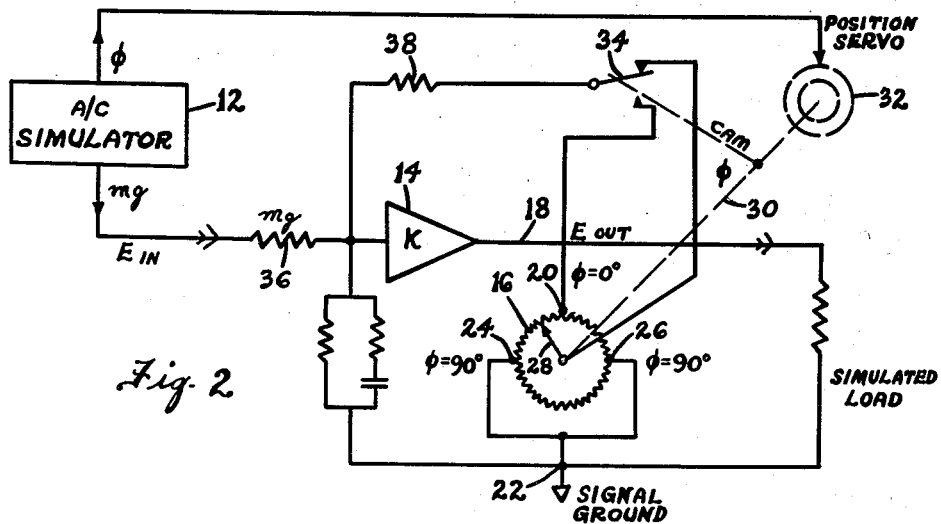
FIG. 2 is an illustrated embodiment of the applicant's invention.

Referring now to FIG. 1, an accelerometer mounted along the vertical axis $Z_A$ of an aircraft 10 is sensitive to two forces. The first is the force due to gravity $mg$. and the second is centrifugal force $F_c$. The centrifugal force sensed by the accelerometer is related to the roll angle of the aircraft $\phi$. During a coordinated turn the relationship between the normal force $F_n$ and the gravitational and centrifugal forces may be set up as follows:

$$\sec \phi = \frac{F_n}{mg} \text{ or } \frac{mg}{\cos \phi} = F_n$$

Therefore, the signal from an aircraft simulator 12, proportional to the force due to gravity $mg$, is fed into an amplifier 14. The output of the amplifier 14 is coupled across a cosinusoidally wound potentiometer 16. The high end of the amplifier's output 18 is connected to the zero degree position 20 of the potentiometer and ground (the amplifier 14 being single ended) is connected to two 90° positions of the potentiometer 16 at 24 and 26.

The potentiometer wiper 28 is positioned as a function by the output shaft 30 of a servo 32. The servo 32 is a position servo and it is fed by roll angle information from the aircraft simulator 12 so that its output shaft position is directly proportional to roll angle $\phi$. Thus, the position of the wiper arm 24 of the potentiometer is directly proportional to the roll angle $\phi$ and the voltage on the winding is a function of the amplifier's 12 output $E_{out}$.

The output of the potentiometer 16, taken off the wiper arm 28, is subtracted from the input $E_{in}$, to form a servo loop around the amplifier 14. Thus, the gain of the amplifier may be written in terms of the formula, $$\frac{E_{out}}{E_{in}} = \frac{K}{1+BK}$$

where K is the gain of the amplifier and beta is the gain of the feedback loop. If we make BK very large with respect to one, we may drop the one and write the formula as follows:

$$\frac{E_{out}}{E_{in}} = \frac{B}{BK} = \frac{1}{B}$$

Since $E_{in}$ is equal to $mg$, and the feedback gain B, is a function of the potentiometer's resistive winding and its wiper arm's position, the gain formula may be rewritten as follows:

$$E_{out} = \frac{mg}{K' \cos \phi}$$

As may be easily seen by this formula, as the roll angle increases $E_{out}$ approaches infinity. To prevent this and thus more realistically portray the output of an accelerometer, where the accelerometer limits before infinity is reached, a switch 34 mounted on the shaft 30 of the position servo 32 switches the feedback loop when the roll angle exceeds 75.5° to provide a fixed gain of 4.

Figure 3:
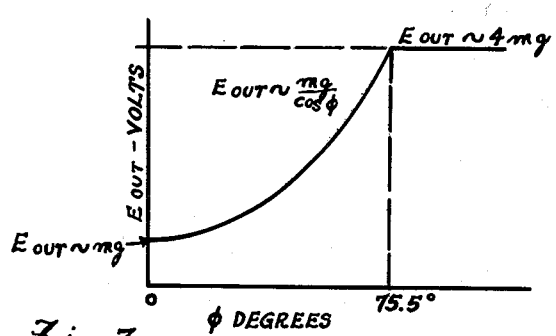
FIG. 3 is the output of the illustrated embodiment of the applicant's invention.

Referring to FIG. 3, the curve of the output is shown where $E_{out}$ is plotted vertically against degrees of roll $\phi$, plotted horizontally. As shown, up to 75.5° the output voltage, $E_{out}$, is proportional to the acceleration due to gravity divided by the cosine of the roll angle while thereafter it is proportional only to the acceleration due to gravity. The maximum value of $E_{out}$ or $F_n$ is determined by the constant $K'$. This constant is fixed by the ratio of the magnitudes of the input summing resistor 36 and the feedback summing resistor 38.

Obviously many modifications and variations of the present invention are possible in the light of the above teachings. It is therefore to be understood that within the scope of the appended claim the invention may be practiced otherwise than as specifically described.

What is claimed is:

A device to simulate the output from an accelerometer mounted along the vertical axis of an aircraft to sense the forces due to gravity and angular rotation during coordinated turns comprising:

servo amplifier means responsive to a signal directly proportional to the force due to gravity;

means for coupling a signal directly proportional to the force due to gravity to said servo amplifier means;

roll servo means having an output shaft which is positioned in accordance with the simulated aircraft's roll angle;

means for coupling a signal directly proportional to the simulated aircraft roll angle to said roll servo means;

feedback means coupled to said servo amplifier means including, a cosinusoidally wound potentiometer having a wiper arm mounted on the roll servo means output shaft for varying the effective gain of said servo amplifier means as a direct function of the secant of the roll angle of the aircraft, and switch means for removing the output of said wiper arm from the feedback means whereby removal of the wiper arm's output from the feedback means provides a fixed gain to the servo amplifier means; and cam means on said servo means output shaft operatively coupled to said switch means for providing said fixed gain to the servo amplifier means when the roll angle exceeds a predetermined limit whereby mechanical limiting in the accelerometer is simulated.

References Cited in the file of this patent

UNITED STATES PATENTS 2,842,867   Dehmel _____ July 15, 1958

OTHER REFERENCES

"Electric Analog Computers," by Korn, pub. by McGraw-Hill in 1952 (pp. 232, 280 and 281 relied upon).

"Principles of Control Systems Engineering," by Del Toro and Parker, pub. by McGraw-Hill in 1960 (p. 565 relied upon).